US010885527B1

(12) United States Patent
Kalaboukis et al.

(10) Patent No.: US 10,885,527 B1
(45) Date of Patent: Jan. 5, 2021

(54) SYSTEMS AND METHODS FOR ANTICIPATING FINANCIAL RISK

(71) Applicant: Wells Fargo Bank, N.A., San Francisco, CA (US)

(72) Inventors: Chris Kalaboukis, San Jose, CA (US); Machu J. Latorre, Alameda, CA (US); Evelyn Ujanen, San Francisco, CA (US); Marria Wairnola Rhodriquez, San Francisco, CA (US); Tleytmas N. Stephenson, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 842 days.

(21) Appl. No.: 15/393,403

(22) Filed: Dec. 29, 2016

(51) Int. Cl.
*G06Q 20/40* (2012.01)
*H04W 4/021* (2018.01)
(Continued)

(52) U.S. Cl.
CPC ......... *G06Q 20/4016* (2013.01); *G06F 16/22* (2019.01); *G06Q 40/02* (2013.01); *H04W 4/021* (2013.01); *G06Q 50/01* (2013.01)

(58) Field of Classification Search
CPC ........... G06Q 20/401; G06Q 20/38215; G06Q 20/3829; G06Q 20/02; G06Q 20/3276; G06Q 20/3674; G06Q 20/065; G06Q 20/3278; G06Q 20/407; G06Q 2220/00; G06Q 20/12; G06Q 20/405; G06Q 20/32; G06Q 20/40; G06Q 20/4014; G06Q 20/425; G06Q 40/08; G06Q 10/06; G06Q 20/10; G06Q 20/123; G06Q 20/4016;
(Continued)

(56) References Cited

U.S. PATENT DOCUMENTS 7,672,870 B2  3/2010 Haines et al.
8,412,605 B2  4/2013 Griffin et al.
(Continued)

FOREIGN PATENT DOCUMENTS

WO  WO-2015192208 A1 * 12/2015 ......... G07F 17/3272

OTHER PUBLICATIONS

White, Ron, How Computers Work, 9th Ed., Que Corporation, Nov. 14, 2007 (Year: 2007).*
(Continued)

*Primary Examiner* — William E Rankins
*Assistant Examiner* — James H Miller
(74) *Attorney, Agent, or Firm* — Foley & Lardner LLP

(57) ABSTRACT

A financial institution computing system includes a network interface, a database storing transaction data of the user and financial data for a plurality of entities, and a processor. The processor receives location data of the mobile device the financial data for at least one of the entities, determines a financial risk of the user based on a comparison of the location of the mobile device with the location of the at least one entity and based on at least one of the financial data for the at least one entity and the transaction data of the user, generate a notification in response to the financial risk exceeding a financial risk threshold, and cause the notification to be transmitted to the mobile device. The notification indicates that the user is susceptible to a financial risk based on the location of the user with respect to the at least one entity.

22 Claims, 6 Drawing Sheets

(51) Int. Cl.
*G06Q 40/02* (2012.01)
*G06F 16/22* (2019.01)
*G06Q 50/00* (2012.01)

(58) Field of Classification Search
CPC ............... G06Q 20/409; G06Q 40/02; G06Q 10/06311; G06Q 20/04; G06Q 20/102; G06Q 20/227; G06Q 20/3223; G06Q 20/3823; G06Q 20/385; G06Q 20/389; G06Q 30/016; G06Q 30/06; G06Q 40/025; G06Q 50/10; G06Q 10/00; G06Q 10/063112; G06Q 10/06312; G06Q 10/06313; G06Q 10/0639; G06Q 10/10; G06Q 10/109; G06Q 10/1095; G06Q 20/027; G06Q 20/145; G06Q 20/202; G06Q 20/223; G06Q 20/3221; G06Q 20/3224; G06Q 20/34; G06Q 20/351; G06Q 20/363; G06Q 20/381; G06Q 20/387; G06Q 20/40145; G06Q 20/42; G06Q 30/00; G06Q 30/02; G06Q 30/0201; G06Q 30/0209; G06Q 30/0222; G06Q 30/0281; G06Q 40/00; G06Q 40/04; G06Q 40/06; G06Q 50/01; G06Q 50/188; G06Q 10/02; G06Q 10/063; G06Q 10/0631; G06Q 10/063114; G06Q 10/063118; G06Q 10/06315; G06Q 10/06316; G06Q 10/0635; G06Q 10/083; G06Q 10/087; G06Q 10/101; G06Q 20/047; G06Q 20/1085; G06Q 20/127; G06Q 20/14; G06Q 20/20; G06Q 20/204; G06Q 20/206; G06Q 20/229; G06Q 20/2295; G06Q 20/24; G06Q 20/30; G06Q 20/325; G06Q 20/3274; G06Q 20/341; G06Q 20/352; G06Q 20/354; G06Q 20/3552; G06Q 20/3672; G06Q 20/3678; G06Q 20/382; G06Q 20/3825; G06Q 20/3827; G06Q 20/383; G06Q 20/4012; G06Q 20/4018; G06Q 20/4033; G06Q 30/0207; G06Q 30/0215; G06Q 30/0233; G06Q 30/0237; G06Q 30/0238; G06Q 30/0255; G06Q 30/0261; G06Q 30/0266; G06Q 30/0267; G06Q 30/0268; G06Q 30/0269; G06Q 30/0609; G06Q 30/0613; G06Q 30/0633; G06Q 30/0635; G06Q 30/0637; G06Q 30/08; G06Q 50/12; G06Q 50/30

USPC ........ 705/44, 37, 39, 36 R, 40, 16, 30, 35, 4, 705/42, 79, 14.36, 14.49, 14.65, 2, 21, 705/34, 52, 65, 71, 78, 7.36
See application file for complete search history.

(56) References Cited

U.S. PATENT DOCUMENTS

| | | | |
|---|---|---|---|
| 8,504,456 B2 | 8/2013 | Griffin et al. | |
| 8,682,764 B2* | 3/2014 | Love | G06Q 10/10 705/35 |
| 8,831,205 B1 | 9/2014 | Wu et al. | |
| 8,868,458 B1* | 10/2014 | Starbuck | G06Q 40/00 705/35 |
| 9,767,474 B1* | 9/2017 | Ramalingam | G06Q 30/0601 |
| 2006/0122943 A1* | 6/2006 | Mann, III | G06Q 20/04 705/65 |
| 2008/0301040 A1* | 12/2008 | Knudson | G06Q 20/10 705/39 |
| 2010/0312724 A1 | 12/2010 | Pinckney et al. | |
| 2012/0094694 A1* | 4/2012 | Malkin | G01S 5/02 455/456.2 |
| 2012/0191596 A1 | 7/2012 | Kremen et al. | |
| 2013/0085861 A1* | 4/2013 | Dunlap | H04W 4/021 705/14.58 |
| 2013/0297471 A1 | 11/2013 | Gaskell, II | |
| 2014/0164199 A1 | 6/2014 | Wilkes | |
| 2014/0379272 A1 | 12/2014 | Sathe | |
| 2015/0081495 A1 | 3/2015 | Randall | |
| 2015/0161610 A1* | 6/2015 | Sahadevan | G06Q 20/4016 705/44 |
| 2015/0350848 A1* | 12/2015 | Eramian | H04W 4/021 455/404.2 |
| 2016/0021507 A1* | 1/2016 | Gaines | H04W 4/023 455/456.2 |
| 2016/0041591 A1* | 2/2016 | Ricket | G05B 11/01 700/275 |
| 2018/0176727 A1* | 6/2018 | Williams | A61B 5/747 |

OTHER PUBLICATIONS

Lee, Heyoung, Heejune Ahn, Samwook Choi, and Wanbok Choi. "The SAMS: Smartphone addiction management system and verification." Journal of medical systems 38, No. 1 (2014): 1. (Year: 2014).*

"Cloudy with a chance of mishap," International Business Machines, 2015, 20 pages.

"The Everyday Bank a New Vision for the Digital Age," Accenture, 2014, 16 pages.

* cited by examiner

US 10,885,527 B1

SYSTEMS AND METHODS FOR ANTICIPATING FINANCIAL RISK

BACKGROUND

People are exposed to various degrees of financial risk on a day to day basis. In some cases, various factors may heighten the level of financial risk for a particular person. For example, some geographic locations may pose a greater financial risk to one person than another person based on a variety of factors, including personality type. Most people tend to want to avoid being subject to fraud or to purposefully put themselves in a situation where their financial risk is high since being a victim of fraud or being exposed to high levels of financial risk may jeopardize various financial goals. Some people have difficulty keeping themselves out of potentially fraudulent or financially risky situations and therefore need to rely on a family member or a friend to help them avoid such situations.

SUMMARY

One example embodiment relates to a financial institution computing system. The system includes a network interface, a database, and a processor. The network interface is configured to communicate with a mobile device of a user. The database stores transaction data of the user and financial data for a plurality of entities, and each entity is associated with a location. The processor is configured to receive, via the network interface, location data indicative of a location of the mobile device; receive, via the network interface, the financial data for at least one entity of the plurality of entities, the at least one entity associated with a location; determine a financial risk of the user based on a comparison of the location of the mobile device with the location of the at least one entity and based on at least one of the financial data for the at least one entity and the transaction data of the user; generate a notification in response to the financial risk exceeding a financial risk threshold, the notification indicating that the user of the mobile device is susceptible to a financial risk based on the location of the user with respect to the at least one entity; and cause the network interface to transmit the notification to the mobile device.

Another example embodiment relates to a method. The method includes receiving, via a network interface, location data indicative of a location of a mobile device associated with a user. The method further comprises receiving, via a network interface, fraud data of a plurality of entities in proximity to the mobile device. The method further comprises determining, by a processor, a financial risk of the user based on a comparison of the location of the mobile device, a geographic location of at least one entity, and fraud data associated with the entity. The method further comprises generating, by the processor, a notification based on the financial risk exceeding a financial risk threshold, the notification indicating that the user of the mobile device is susceptible to a financial risk based on the location of the user. The method further comprises causing, by the processor, the network interface to transmit the notification to the mobile device.

A further example embodiment relates to an apparatus. The apparatus includes a non-transitory memory having instructions stored therein and at least one processor configured to execute the instructions to receive, via a network interface, a user habit associated with a user and a location of a mobile device associated with the user. The instructions further cause the processor to receive, by the network interface, social media activity associated with the user from a social media server. The instructions further cause the processor to determine a financial risk of the user based on the location of the mobile device, the habit of the user, and the social media activity. The instructions further cause the processor to generate a notification based on the financial risk and cause the network interface to send the notification to the mobile device via the network interface.

These and other features, together with the organization and manner of operation thereof, will become apparent from the following detailed description when taken in conjunction with the accompanying drawings.

DETAILED DESCRIPTION

Figure 1:
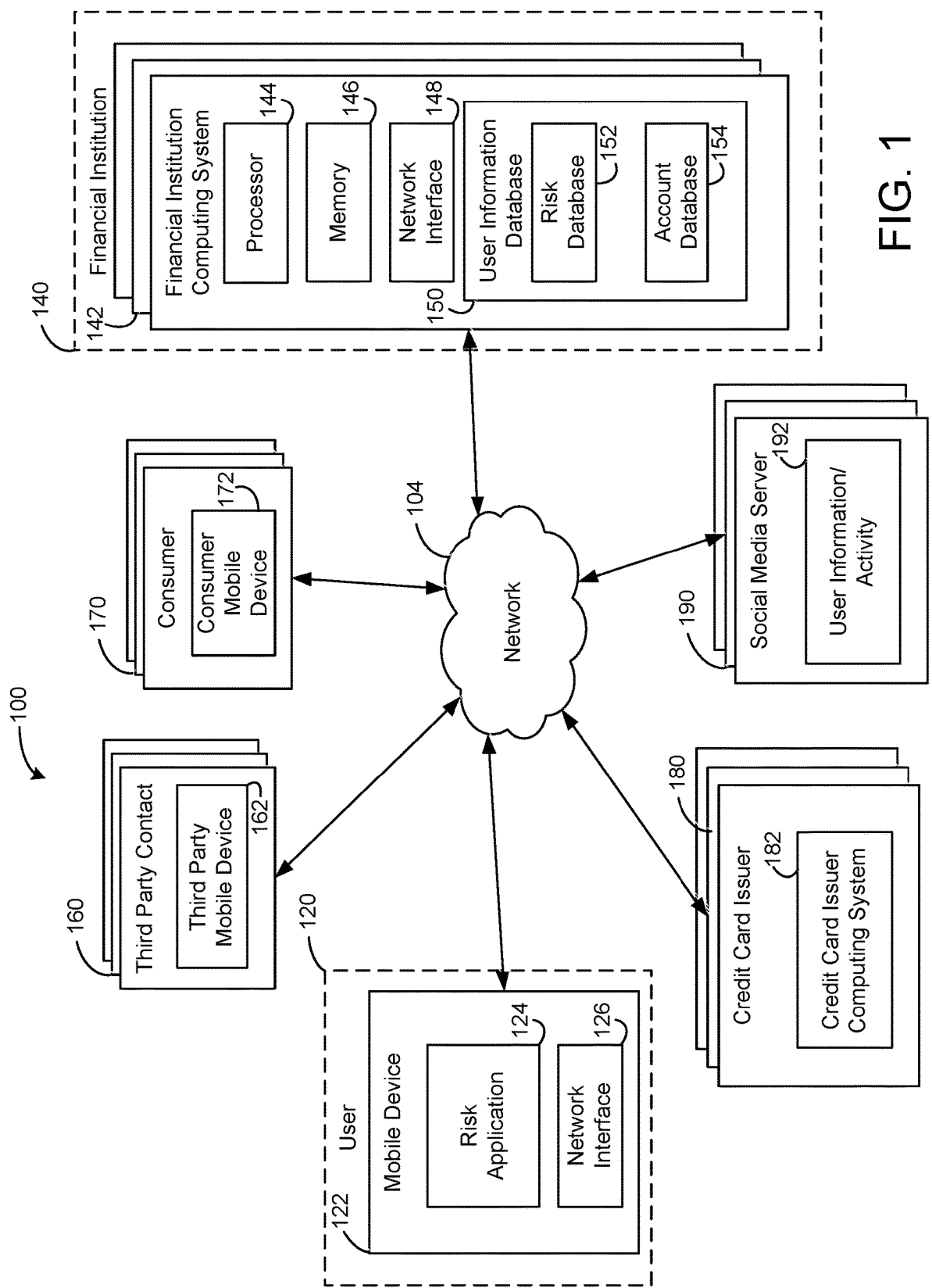
FIG. 1 is a schematic diagram of a financial risk anticipation system including a mobile device and a financial institution computing system, according to an example embodiment.

Referring to the Figures generally, various systems, methods, and apparatuses for identifying financial risk associated with a user of a financial institution are described herein. According to one embodiment, the financial institution computing system is communicably coupled to a user device and a third party device. The financial institution computing system may store risk factors such as fraud levels associated with geographic areas, certain entities (e.g., businesses, establishments) and/or an entity or person associated with a geographic location in a risk database. The risk database may also store the location of the business and/or entity. In some embodiments, if a business and/or entity is associated with a fraud level exceeding a predefined threshold, the financial risk anticipation system 100 may determine that the business and/or entity is a high-risk entity and/or business. The financial risk anticipation system 100 may also determine that the location surrounding the entity and/or business may be a high-risk location. The user device may report the current location of the user device to the financial institution computing system based on GPS coordinates of the user device. Based on the location of the user device with respect to a high risk-area, the financial institution computing system may determine that the user is in financial danger (e.g., exposed to a financial risk, exposed to a fraud risk).

Beneficially, tracking a user and comparing the location of the user to known high-risk locations can be used to warn users and/or third party contacts that the user may be in financial danger. By predicting that a user is in a financially dangerous location, and therefore may be taken advantage of or may be liable to make a poor financial decision, the financial instruction computing system can send warning notifications to the user and/or to the third party. In some embodiments, the financial institution computing system can deactivate a financial account of the user to stop the user from making poor financial decisions or otherwise take an action to reduce the likelihood of financial harm to the user.

The financial institution computing system may also receive inputs regarding user habits (e.g., spending habits, user vices, financial goals, etc.) from at least one of the user and the third party contact. As used herein, "user habits" or "user financial habits" may refer to spending habits, user vices, financial goals, etc. User vices may include an alcohol problem, a spending problem, a gambling problem, and/or any other user vice. Spending habits may refer to the amount of money that the user typically spends at certain locations and/or at certain entities (e.g., bars, casinos, shopping malls, etc.). Further, financial goals may refer to various spending limits or goals of the user. For example, a spending goal may be to spend under $100 on a Friday night or under $50 at a certain restaurant. The financial institution computing system may be able to send a warning notification to the user and/or the third party contact when the user is in financial trouble based on the habits and financial goals of the user. In some embodiments, the financial institution computing system may deactivate a financial account of the user when the user does not heed warning messages or makes bad financial decisions such as spending too much money on certain types of purchases (e.g., gambling, shopping). In some embodiments, the financial institution computing system may force users to avoid casinos, bars, or other entities based on spending habits of the user.

Referring now to FIG. 1, a block diagram of a financial risk anticipation system 100 is shown, according to an example embodiment. As described herein, financial risk anticipation system 100 may be configured to anticipate financial risk of a user and may take appropriate actions to prevent the user from being taken advantage of or spending money that the user otherwise would not spend but for the financial risk. As shown, the financial risk anticipation system 100 includes mobile device 122 associated with a user 120, a financial institution 140 that has one or more associated financial institution computing systems 142, third party contacts 160 having third party mobile devices 162, one or more consumers 170 having a consumer mobile devices 172, one or more credit card issuers 180 associated with one or more credit card issuer computing systems 182, and one or more social media servers 190 associated with online user information/activity 192 of the user 120.

User 120 may have at least one financial account with the financial institution 140. In some embodiments, user 120 is an individual, a group of individuals, a business and/or any other entity. The user 120 may have one or more associated mobile devices (e.g., mobile device 122). The mobile device 122 may include any wearable device, which may refer to any type of device that a user can wear including, but not limited to, a watch (e.g., a smart watch), glasses (e.g., smart glasses), bracelet (e.g., a smart bracelet), etc. Mobile device 122 may also include any type of mobile device of a user 120 including, but not limited to, a phone (e.g., a smartphone) and a computing device (e.g., a tablet computer, a laptop computer, a personal digital assistant, etc.). Accordingly, the mobile device 122 may include a display device (e.g., a screen) and one or more input/output devices (e.g., a touch screen, microphone, speaker, keyboard, etc.).

Network interface 126 of mobile device 122 may be adapted for and configured to establish communication via the network 104 with the financial institution computing system 142. Accordingly, the network interface 126 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface 126 communicates via a secured wired connection within a branch of the financial institution 140.

The components of FIG. 1 may be communicably and operatively couple to each other over network 104. The network 104 may be any type of network. For example, network 104 may include any network including wired (e.g., Ethernet) and/or wireless networks (e.g., 802.11X, ZigBee, Bluetooth, Wi-Fi, Code Division Multiple Access (CDMA), Global System for Mobile Communications (GSM), Long-Term Evolution (LTE), etc.) In some arrangements, the network 104 includes the Internet. In further embodiments, the network 104 includes a proprietary banking network to provide secure or substantially secure communications. Network 104 is structured to permit the exchange of data, values, instructions, messages, and the like between and among the mobile device 122, third party mobile device 162 associated with third party contact 160, consumer mobile device 172 associated with consumer 170, credit card issuer computing system 182 associated with credit card issuer 180, and user information/activity 192 associated with social media server 190.

As shown, financial institution 140 includes a financial institution computing system 142. The financial institution computing system 142 includes a processor 144 and memory 146. The processor 144 may be implemented as a general-purpose processor, an application specific integrated circuit (ASIC), one or more field programmable gate arrays (FPGAs), a digital signal processor (DSP), a group of processing components, or other suitable electronic processing components. Memory 146 (e.g., RAM, ROM, NVRAM, Flash Memory, hard disk storage, etc.) may store data and/or computer code for facilitating at least some of the various processes described herein. In this regard, memory 146 may store programming logic that, when executed by processor 144, control the operation of financial institution computing system 142.

As shown, financial institution computing system 142 includes a network interface 148. Network interface 148 facilitates the sending and receiving of data over network 104 (e.g., to and from the mobile device 122, third party mobile device 162, consumer mobile device 172, credit card issuer computing system 182, social media servers 190, etc.). The network interface 148 includes program logic that facilitates connection of financial institution computing system 142 to network 104. Network interface 126 supports communication between the financial institution computing system 142 and other systems, such as mobile device 122 and social media server 190. For example, network interface 148 includes a cellular modem, a Bluetooth transceiver, a Bluetooth beacon, a radio-frequency identification (RFID) transceiver, and a near-field communication (NFC) transmitter. In some embodiments, network interface 148 communicates via a secured wired connection within a branch of financial institution 140. In some arrangements, the network interface 148 includes the hardware and machine-readable media sufficient to support communication over multiple channels of data communication. Further, in some arrangements, network interface 148 includes cryptography capabilities to establish a secure or relatively secure communication session with financial institution computing system 142 and mobile device 122. In this regard, financial data (or other types of data) may be encrypted and transmitted to prevent or substantially prevent the threat of hacking.

Financial institution computing system 142 may also include a user information database 150. User information database 150 may be configured to store user information, account information, inputs regarding user habits, fraud data associated with entities (e.g., businesses, casinos, bars, etc.), etc. User information database 150 includes a risk database 152 and an account database 154. Risk database 152 stores information regarding user 120 and/or any other user. In some embodiments, risk database 152 may store information regarding personal problems of user 120 (e.g., gambling problems, spending problems, etc.). Further, risk database 152 may store spending limits preferred by user 120 and contact numbers for third party contacts (e.g., family members, spouse, counselor, therapist, parole officer etc.) Risk database 152 may store rules associated with user 120 and the personal problems stored in risk database 152. For example, risk database 152 may store location thresholds and/or spending limits. A location threshold may define a time limit that a user (e.g., user 120) can spend in a certain location (e.g., a bar, a casino, etc.) before a notification is sent to mobile device 122 and/or third party mobile device 162. In some embodiments, a penalty for spending over a predefined amount of time in a financially risky location (e.g., a bar, a casino, etc.) is a financial account lock.

In some embodiments, risk database 152 stores information relating to various locations (e.g., neighborhoods) and information relating to various entities (e.g., businesses, stores, casinos, payday loans, etc.) Information collected by financial institution computing system 142 via mobile device 122, third party mobile device 162, credit card issuer computing system 182, social media server 190, consumer mobile device 172, and any other system and/or device may be stored in risk database 152. Information stored in risk database 152 may include user vices, user spending habits, online reviews of various entities, reported chargebacks for an entity, number of chargebacks in a time window (e.g., day, month, year, etc.) for an entity, number of fraud complaints made against an entity, etc. Information stored in the risk database 152 may further include spending limits of a user (e.g., user 120), actions to take when a user (e.g., user 120) is in danger zones, etc.

Account database 154 stores user information and account information relating to accounts held with the financial institution 140 of a user (e.g., user 120). Account database 154 may be configured to hold, store, categorize, and otherwise serve as a repository for information associated with accounts held by the user (e.g., user 120). For example, the account database 154 may store account numbers, account balances, account ownership information, and the like. The account database 154 is structured to selectively provide access to information relating to an account at the financial institution 140.

As shown, third party contact 160 includes a third party mobile device 162. The third party mobile device 162 may be a watch (e.g., a smart watch), glasses (e.g., smart eye glasses, smart sun glasses, etc.), a bracelet (e.g., a smart bracelet), a phone (e.g., a smartphone, etc.) and a computing device (e.g., a tablet computer, a laptop computer, personal digital assistant, etc.). The third party mobile device 162 can send and receive data (e.g., data, texts, phone calls, etc.) over the network 104 (e.g., to and from the third party mobile device 162, financial institution computing system 142, etc.). The third party contact may be a family member of user 120, a spouse of user 120, a parole officer of user 120, a therapist of user 120, and/or any other individual who user 120 may want to designate as third party contact 160. Third party mobile device 162 may be configured to receive warning messages based on the location of user 120 and the spending of user 120.

In some embodiments, the warning message may be a text and/or an automated phone call. The third party contact may receive a message via third party mobile device 162 when user 120 spends over a certain limit, has spent a certain amount of money on a particular category of item (e.g., alcoholic beverages), is in a certain type of location (e.g., a casino, a bar, etc.), is within a predefined distance from a certain type of location (e.g., a casino, a bar, etc.), and/or any other message associated with financial and/or health risks of user 120. Further, the third party mobile device 162 may be configured to deactivate financial accounts held by user 120. For instance, third party contact 160 may receive a message via third party mobile device 162 that user 120 has spent $140 on alcoholic beverages. The third party contact 160 may be able to send a message to financial institution 140 causing accounts held by user 120 to temporarily be deactivated and/or be deactivated for certain item purchases (e.g., alcoholic beverages, tattoos, etc.) but remain active for other item purchases (e.g., Uber, taxis, food, etc.).

As shown, consumer 170 includes a consumer mobile device 172. Consumer mobile device 172 smart glasses, bracelet (e.g., a smart bracelet), a phone (e.g., a smartphone, etc.) and a computing device (e.g., a tablet computer, a laptop computer, a personal digital assistant, etc.). Consumer mobile device 172 can send and receive data (e.g., data, texts, phone calls, etc.) over the network 104 (e.g., to and from financial institution computing system 142, etc.). Consumer 170 may be an individual, a business, and/or any other entity with a mobile device. Consumer 170 may be able to send fraud reports for stores and/or entities (e.g., shopping malls, restaurants, payday loans, etc.) to financial institution computing system 142. Financial institution computing system 142 may be configured to receive the fraud reports and determine a fraud level for each store. In some embodiments, the fraud level is a percentage of consumers reporting fraud at a store or otherwise a reliability rating (e.g., zero stars indicating unreliable, five stars indicating that the store is reliable, etc.) and/or any other method for assigning fraud scores to businesses. In various embodiments, the fraud level sent to financial institution computing system 142 is from a rating website. In various embodiments, consumer 170 is a rating website such as CONSUMER REPORTS®, YELP®, and/or any other rating website.

Financial risk anticipation system 100 is shown to include credit card issuer 180. Credit card issuer 180 is shown to be associated with credit card issuer computing system 182. Computing system 182 may be configured to communicate with financial institution computing system 142 via network 104. Credit card issuer computing system 182 may be configured to send data to and receive data from financial institution computing system 142 via network 104. In some embodiments, credit card issuer computing system 182 sends fraud reports to financial institution computing system 142. Credit card issuer computing system 182 may store information regarding a number of purchases and/or amounts spent at certain stores and may record any fraud information (e.g., stolen credit card number, illegal activity, scamming instances, etc.) Financial institution computing system 142 may be configured to receive the fraud reports and maintain a fraud level for each store. In some embodiments, the fraud level is a percentage determined from the consumers 170 reporting fraud at a store and fraud reports from credit card issuer 180. Scores may be assigned to businesses such as a percentage of fraud reported at the store, an average reported shopping rating (e.g., "Excellent", "Average", "Below Average", zero stars, five stars, etc.), etc.

One or more social media servers 190 may be communicatively coupled to financial institution computing system 142 via network 104. In some embodiments, the social media server may log information associated with user 120 (e.g., user information/activity 192) and transmit the user information/activity 192 to financial institution computing system 142. User information/activity 192 may be private messages, public and/or private posts, event notifications, location check-ins, etc. Financial institution computing system 142 may be configured to receive the user information/activity 192 and determine the mood of user 120, the location of user 120, the individuals which user 120 is with, and/or any other information. The financial institution computing system 142 may be configured to monitor certain words and/or phrases to determine if the user 120 is planning to participate in certain activities that may put the user 120 at a high risk of financial harm, such as getting drunk, visiting a casino, and/or engaging in any other activity which may be financially harmful for user 120.

The financial institution computing system 142 may correlate the spending habits of user 120 to times when user 120 is with a particular friend and/or group of friends. Financial institution computing system 142 may use this information to make predictions about the spending habits of user 120 and may be configured to serve warning notifications to user 120 via mobile device 122 and/or third party contact 160 via third party mobile device 162. For example, in some embodiments, the notification is sent to user 120 via mobile device 122 and could state, "You are with Tom tonight at Bill's Bar, last time you were at Bill's Bar with Tom, you spent $146". A notification could also be sent to third party contact 160 via third party mobile device 162 and could state, "Mary is with Tom tonight at Bill's Bar, last time Mary was at Bill's Bar with Tom, Mary spent $146."

Figure 2:
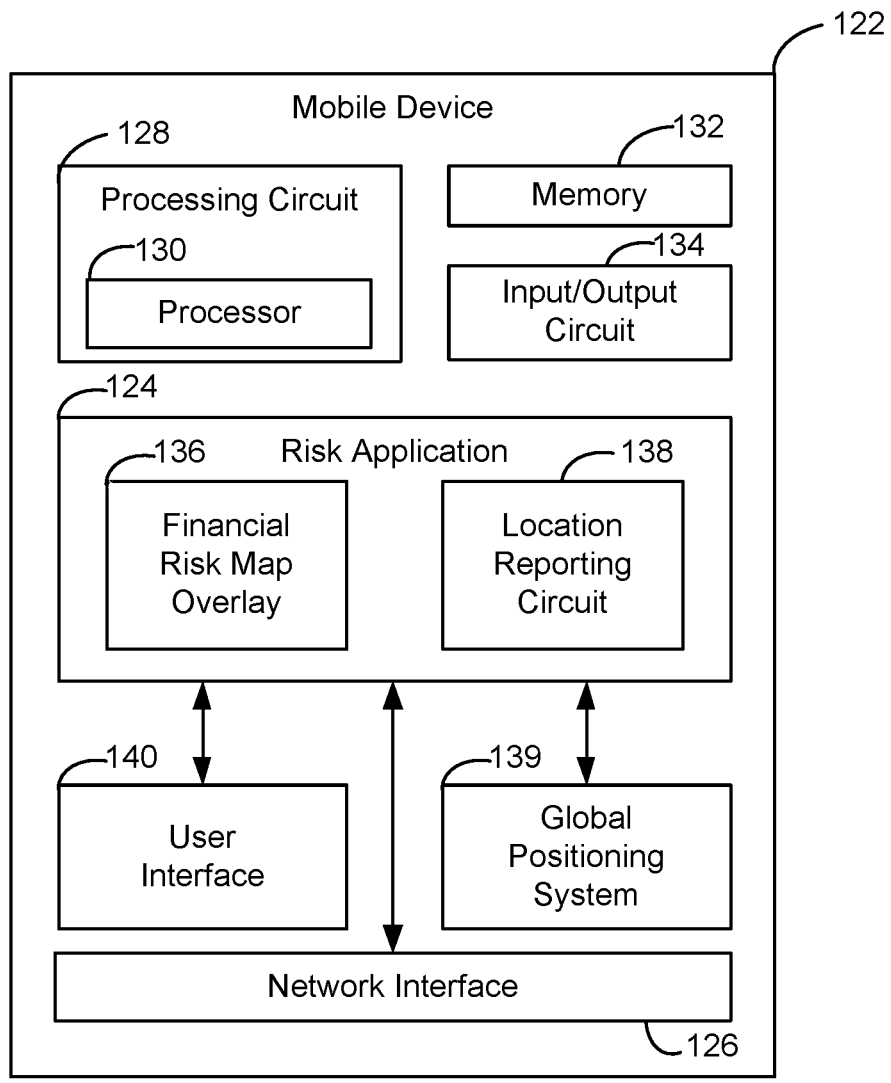
FIG. 2 is a diagram of the mobile device system of FIG. 1 shown in greater detail, according to an example embodiment.

Referring now to FIG. 2, a diagram of mobile device 122 is shown in greater detail according to an example embodiment. As shown, mobile device 122 includes a processing circuit 128 having a processor 130. Mobile device 122 also includes memory 132. The processor 130 may be implemented as a general-purpose processor, an application specific integrated circuit (ASIC), one or more field programmable gate arrays (FPGAs), a digital signal processor (DSP), a group of processing components, or other suitable electronic processing components. The memory 132 (e.g., RAM, NVRAM, ROM, Flash Memory, hard disk storage, etc.) may store data and/or computer code for facilitating the various processes described herein. Moreover, the memory 132 may be or include tangible, non-transient volatile memory or non-volatile memory. Accordingly, the memory 132 may include database components, object code components, script components, or any other type of information structure for supporting the various activities and information structures described herein.

Mobile device 122 is shown to include risk application 124. Risk application 124 is shown to include financial risk map overlay circuit 136 and location reporting circuit 137. Risk application 124 may communicate with financial institution computing system 142 as described with further reference to FIG. 1 via network interface 126. The location reporting circuit 137 may be structured to receive location data from global positioning system 139 and determine a location of the mobile device 122 based on the location data. In one embodiment, the location reporting circuit 137 may receive latitude data, longitude data, and any other type of location or position data from global positioning system 139 to determine the location of the mobile device 122. In some embodiments, location reporting circuit 137 sends the location of mobile device 122 (e.g., a coordinate) and/or may send the name and/or identifier of the business which the mobile device 122 is located near (e.g., in the parking lot, inside the business, etc.) to the financial institution computing system 142. Risk application 124 may be configured to provide spending alerts and/or account alerts to user 120 via a display interface, a Bluetooth earpiece, a smartwatch, and/or smart glasses. In some embodiments, risk application 124 provides a financial security overlay to a map application (e.g., Google Maps™) The overlay may identify local businesses and/or entities (e.g., grocery stores, casinos, payday loan merchants, etc.) and may identify reported fraud (e.g., fraud reporting rates, fraud reporting percentages, etc.) associated with the business and/or entity.

Financial risk map overlay circuit 136 may be configured to receive fraud reports for businesses within a predefined radius from mobile device 122. In some embodiments, financial risk map overlay circuit 136 receives the fraud reports from financial institution computing system 142. Financial risk map overlay circuit may be configured to display a map interface reporting a fraud score for each business near mobile device 122 over a preexisting map and/or navigation application (e.g., Google Maps™)) Mobile device 122 may cause user interface 138 to display a warning message within the map overlay alerting user 120 of locations near the user 120 where a heightened risk of fraud typically occurs.

The input/output circuit 134 is structured to receive and provide communication(s) to a user of the device 122. In this regard, the input/output circuit 134 is structured to exchange data, instructions and otherwise communicate with an input/output component of mobile device 122. Accordingly, in one embodiment, the input/output circuit 134 includes an input/output device such as a display device (e.g., user interface 138), a touchscreen, a keyboard, and a microphone. In some embodiments, the input/output circuit 134 may include communication circuitry for facilitating the exchange of data, values, messages, and the like between an input/output device and the components of mobile device 122. In yet another embodiment, the input/output circuit 134 may include machine-readable media for facilitating the exchange of information between the input/output circuit 134 and the components of mobile device 122. In some embodiments, the input/output circuit 134 may include any combination of hardware components (e.g., a touchscreen), communication circuitry, and machine-readable media.

Figure 3:
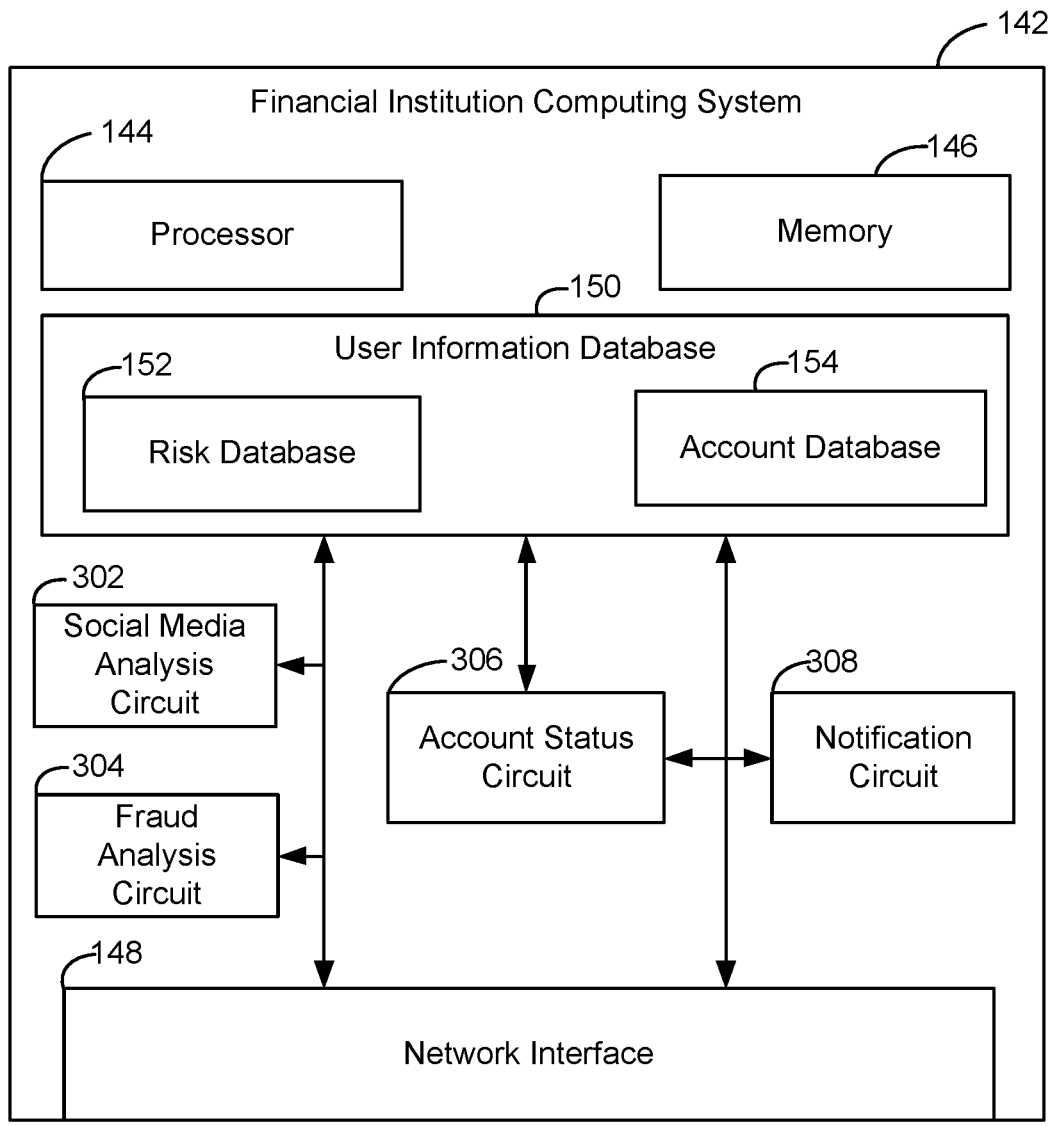
FIG. 3 is a diagram of the financial institution computing system of FIG. 1 shown in greater detail, according to an example embodiment.

Referring now to FIG. 3, a diagram of the financial institution computing system 142 is shown in greater detail according to an example embodiment. As shown, financial institution computing system 142 includes a processor 144 and memory 146. The processor 144 may be implemented as a general-purpose processor, an application specific integrated circuit (ASIC), one or more field programmable gate arrays (FPGAs), a digital signal processor (DSP), a group of processing components, or other suitable electronic processing components. The memory 146 (e.g., RAM, NVRAM, ROM, Flash Memory, hard disk storage, etc.) may store data and/or computer code for facilitating the various processes described herein. Moreover, the one or more memory devices 146 may be or include tangible, non-transient volatile memory or non-volatile memory. Accordingly, the one or more memory devices 146 may include database components, object code components, script components, or any other type of information structure for supporting the various activities and information structures described herein.

In some embodiments, financial institution computing system 142 includes social media analysis circuit 302 and fraud analysis circuit 304. In some embodiments, social media analysis circuit 302 is configured to receive social media activity (e.g., user information/activity 192) from social media server 190 associated with user 120. In some embodiments, the social media activity may be posts, message, likes, events, etc. Social media analysis circuit 302 may be configured to determine the mood of user 120, what group of friends user 120 is with, and/or any other information relating to financial risks of user 120. In some embodiments, social media analysis circuit 302 stores the mood of user 120, what group of friends user 120 is with, and/or any other information in risk database 152.

In some embodiments, fraud analysis circuit 304 is configured to analyze potential risks for user 120 based on information received from network 104 and/or stored in risk database 152. In some embodiments, fraud analysis circuit 304 may be configured to communicate with credit card issuer 180 (e.g., receive fraud information from credit card issuer 180). In some embodiments, the fraud information may include the business name, business location, and type of fraud (e.g., overdraw, will not accept return, etc.). In various embodiments, fraud analysis circuit 304 receives business ratings directly from a ratings website (e.g., CONSUMER REPORTS®, YELP®, etc.). Fraud analysis circuit 304 may receive fraud reports directly from consumer mobile devices 172. Fraud analysis circuit 304 may determine fraud scores, fraud percentages, and/or other ratings for any number of business and/or entities based on the fraud reports received from consumer mobile devices 172. Fraud analysis circuit 304 may cause the fraud scores and/or ratings to be sent to financial risk map overlay circuit 136 of mobile device 122. In some embodiments, fraud analysis circuit 304 causes the fraud scores, ratings, and/or any other information collected by fraud analysis circuit 304 to be stored in risk database 152.

In some embodiments, financial institution computing system 142 includes account status circuit 306. In some embodiments, account status circuit 306 is configured to activate and/or deactivate a financial account associated with user 120. Based on the risks stored in risk database 152 and the location of user 120 reported by mobile device 122, account status circuit 306 may be configured to deactivate a financial account associated with user 120. In some embodiments, the account status circuit 306 may be configured to deactivate the financial account associated with user 120 when user 120 spends over a certain amount of funds in a predefined window of time. In some embodiments, the account status circuit 306 is configured to deactivate the financial account of user 120 for only certain products (e.g., alcohol, tattoos, purchases costing more than a predefined amount) when the user 120 is in a financially dangerous location (e.g., nearby and/or in a payday loans store, nearby and/or in a tattoo parlor, nearby and/or in a casino, a bar, etc.). In some embodiments, account status circuit 306 is configured to activate the financial account of a user when the account has been deactivated for a predefined amount of time and/or when third party contact 160 sends a message to account status circuit 306 via network interface 148 indicating that the account should be activated (e.g., override an account deactivation).

In some embodiments, the determination to deactivate a financial account of a user is based on determining that the user is in a high-risk location and/or has a financial risk value above a predefined threshold. In some embodiments, account status circuit 306 determines that a high-risk location has a risk value above a predefined threshold. In some embodiments, the location is associated with one or more businesses and/or entities. The risk value may be determined by account status circuit 306 based on fraud complaints associated with the entity, how close a user is to the entity, the number of complaints made against the entity, number of lifetime chargebacks, chargebacks within a predefined time window, and/or any other information. In some embodiments, the information may be received by account status circuit 306 and/or retrieved by account status circuit 306 from any kind of webserver and/or computing system. In some embodiments, the information is retrieved by account status circuit 306 from a credit card issuer 180, consumer 170, and/or any other individual and/or entity. In various embodiments, the information is retrieved from risk database 152.

Account status circuit 306 may deactivate a financial account of a user (e.g., user 120) when a financial risk value is above a predefined level. In some embodiments, account status circuit 306 uses at least one of user habits (e.g., gambling problems, drinking problems, financial goals, etc.), the location of the user (e.g., user 102), companions that are currently with the user, the current mood of the user, and/or any other information that may be stored in risk database 152 to determine a financial risk value.

Notification circuit 308 is configured to send notifications to mobile device 122 associated with user 120 and/or third party mobile device 162 associated with third party contact 160. In some embodiments, notification circuit 308 sends the message based on information stored in risk database 152. In some embodiments, notification circuit 308 determines that the user is in a high risk location, and/or otherwise has a high financial risk. In some embodiments, notification circuit 308 uses at least one of the user habits (e.g., gambling problems, drinking problems, etc.), the location of the user (e.g., user 102), companions currently with the user, a current mood of the user, and/or any other information that may be stored in risk database 152 to determine the financial risk value. When the financial risk value exceeds a predefined threshold, notification circuit 308 may send the notification to mobile device 122, third party mobile device 162, and/or any other device and/or system. In some embodiments, based on the location of user 120 with respect to financially risky locations identified by account status circuit 306 and/or by notification circuit 308, notification circuit 308 may be configured to generate a message in response to the user 120 being in and/or within a certain distance from a financially risky area for the user 120 indicating that the user 120 may be likely to suffer from financial harm due to being in and/or near the financially risky area.

Notification circuit 308 may be configured to identify a high-risk location. In some embodiments, the location is associated with one or more businesses and/or entities. The risk value may be determined by notification circuit 308 based on fraud complaints associated with the entity, how close a user is to the entity, the number of complaints made against the entity, a number of lifetime chargebacks, a number of chargebacks made within a predefined time window, and/or any other information. In some embodiments, the information may be received and/or retrieved from any kind of webserver and/or computing system. In some embodiments, notification circuit 308 can retrieve the information from a credit card issuer 180, consumer 170, and/or any other individual and/or entity. In various embodiments, the information is retrieved by notification circuit 308 from risk database 152.

In some embodiments, the messages generated by notification circuit 308 are warnings that may notify user 120 via mobile device 122 that user 120 is in financial trouble. In some embodiments, the notification may suggest an alternate activity. The notification circuit may inform user 120 that the financial accounts associated with user 120 will be deactivated if the user does not leave the risky financial location in a predefined amount of time.

In some embodiments, notification circuit 308 may be configured to send a notification to third party contact 160 via third party mobile device 162. In some embodiments the notification may inform third party contact 160 that user 120 is in a financially risky location (e.g., a high-risk location), has spent more than a predefined amount of funds, and/or that the accounts associated with user 120 will be deactivated. In some embodiments, the notification may present third party contact 160 an option for deactivating a financial account associated with user 120 or for contacting the user 120 directly (e.g., via a phone call or text message). In some embodiments, the notification may allow third party contact 160 to override an account deactivation. Notification circuit 308 may send an activation and/or deactivation message received from third party contact 160 to account status circuit 306. Account status circuit 306 may activate and/or deactivate one or more account and/or financial accounts of a user (e.g., user 120) as applicable.

Figure 4:
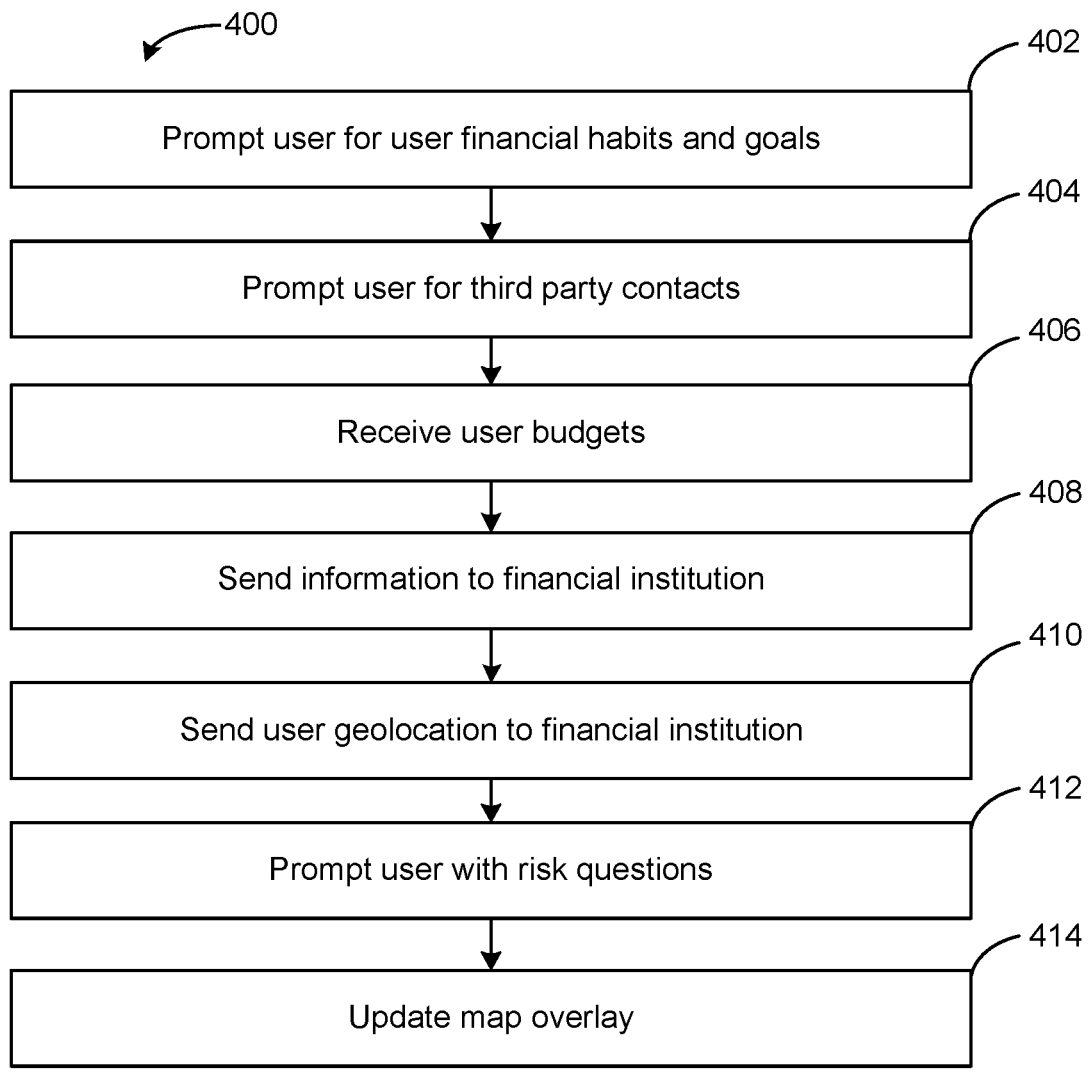
FIG. 4 is a flow diagram of a method for receiving user financial habits and goals from a user, according to an example embodiment.

Referring now to FIG. 4, a process 400 for receiving user information from a user (e.g., user 120) is shown according to an exemplary embodiment. Process 400 may be implemented by financial institution computing system 142 and/or mobile device 122.

At process 402, the user 120 is prompted to enter his or her financial habits or goals (e.g., vices, savings goals, etc.) via mobile device 122. Financial habits may include vices, such as excessive drinking, excessive gambling, frequently obtaining payday loans, excessive spending on clothes etc. In some embodiments, the user 120 is able to assign each habit a rating value to quantify the importance of the habit or to indicate that the habit is one that the user would like to limit or stop. In some embodiments, third party contact 160 may enter the habits of user 120 via third party mobile device 162. In some embodiments, user 120 and/or third party contact 160 can create a custom habit. The custom habit may identify certain bars, restaurants, casinos, or other places of business where the user 120 frequently overspends or otherwise makes poor financial decisions. The custom vice could set spending limits at a certain bar, restaurant, casino, or other place of business. Further, the custom vice could identify certain friends or groups of friends that the user 120 cannot spend money with or has a spending limit for when they are together. The habit information may be stored in risk database 152 and may be used by account status circuit 306 and/or notification circuit 308 to determine risk levels associated with user 120 and to activate financial accounts and/or send notifications to user 120 via mobile device 122.

At process 404, the user 120 is prompted via mobile device 122 to enter a third party contact. In some embodiments, the third party contact may be automatically determined. For example, the wife of user 120 may be automatically entered as the third party contact 160 if the wife is the joint owner of a bank account with user 120 at financial institution 140 and/or has a joint credit card with user 120. In some embodiments, the user 120 enters the name and contact information of an individual whom user 120 wishes to add as the third party contact 160. Any individual can be identified as the third party contact. In some embodiments, the third party contact is a spouse, an adult child, a parent, a therapist, a counselor, a parole officer, and any other individual whom user 120 wishes to list as a third party contact 160. In some embodiments, the third party contact must agree to be listed by user 120. When user 120 lists an individual as a third party contact, a notification may be sent from the financial institution computing system 142 to a mobile device of the possible third party contact asking if the possible third party contact agrees to be a third party contact for user 120.

At process 406, the user 120 and/or third party contact 160 may be prompted to enter, via mobile device 122 and/or third party mobile device 162, spending budgets of user 120. In some embodiments, the spending budgets may be the amount of money the individual can spend in a day, an evening, on a weekend, at a certain business (e.g., certain bar, certain casino, etc.), at a certain business type (e.g., bar casino, etc.), with a certain friend and/or group of friends, and/or on a certain item type (e.g., clothes, food, beer, alcohol, gambling deposit, etc.) In some embodiments, danger zones may be identified by the user and/or third party. The danger zones may be businesses at which the user 120 typically makes risky financial decisions. In some embodiments, average spending limits are determined by monitoring consumers 170. Financial institution computing system 142 may identify an average spending budget of consumers 170 who have similar traits as user 120 and/or are located near user 120. Traits may include age, employment, number and quantity of loans, etc. The financial institution may determine spending budgets for user 120 by adding a predetermined overhead to the average spending budgets of consumers 170 having similar traits.

At process 408, the information collected via mobile device 122, third party mobile device 162, credit card issuer computing system 182, social media server 190, consumer mobile device 172, and any other system and/or device is sent to the financial institution computing system via network 104. The financial institution computing system may be configured to store the information in risk database 152. Information stored in risk database 152 may be user vices, user habits, user financial goals, online reviews of various entities, reported chargebacks for an entity, number of chargebacks in a month for an entity, number of fraud complaints made against an entity, etc. Information stored in the risk database 152 may include spending limits of user 120, actions to take when user 120 is in danger zones, etc.

At process 410, the mobile device 122 of user 120 may be configured to determine the location of mobile device 122 with global positioning system 139 and transmit the position of mobile device 122 to the financial institution computing system 142. The financial institution computing system 142 may be configured to determine businesses that the user 120 frequents or is currently located at. Further, if financial institution computing system 142 has access to the global positioning systems 139 of the mobile devices associated with the friends of user 120, the financial institution computing system 142 may be configured to aggregate all the locations of the friends and determine what group of friend that the user 120 is currently with.

At process 412, the mobile device 122 of user 120 may periodically prompt user 120 with a question. The question may be provided to user 120 to determine the business the user 120 is currently at, the group of friends the user 120 is currently with, how many drinks the user 120 has purchased, how much money the user 120 has spent, etc. By providing questions to the user 120, information regarding the financial risk of the user 120 that cannot otherwise be collected can be obtained.

At process 414, financial risk map overlay circuit 136 updates a map displaying fraud data for each business and/or entity near mobile device 122. In various embodiments, financial risk map overlay circuit 136 periodically updates the map interface. Further, financial risk map overlay circuit 136 may update the map interface whenever user 120 of mobile device 122 views the financial risk map (e.g., opens a financial risk map application on mobile device 122). Financial risk map overlay circuit 136 may communicate with financial institution computing system 142 to retrieve fraud data (e.g., fraud scores) for various businesses near mobile device 122. In some embodiments, financial risk map overlay circuit 136 communicates with global positioning system 139 to determine the current position of mobile device 122. Financial risk map overlay circuit 136 may send the current position of mobile device 122 with a request for fraud data and/or any other data associated with businesses within a certain proximity of mobile device 122 to financial institution computing system 142. Based on the fraud data received from financial institution computing system 142, financial risk map overlay circuit 136 can provide a score for each nearby business displayed on a financial risk map and/or over a preexisting map in a navigation application (e.g., Google Maps™).

Figure 5:
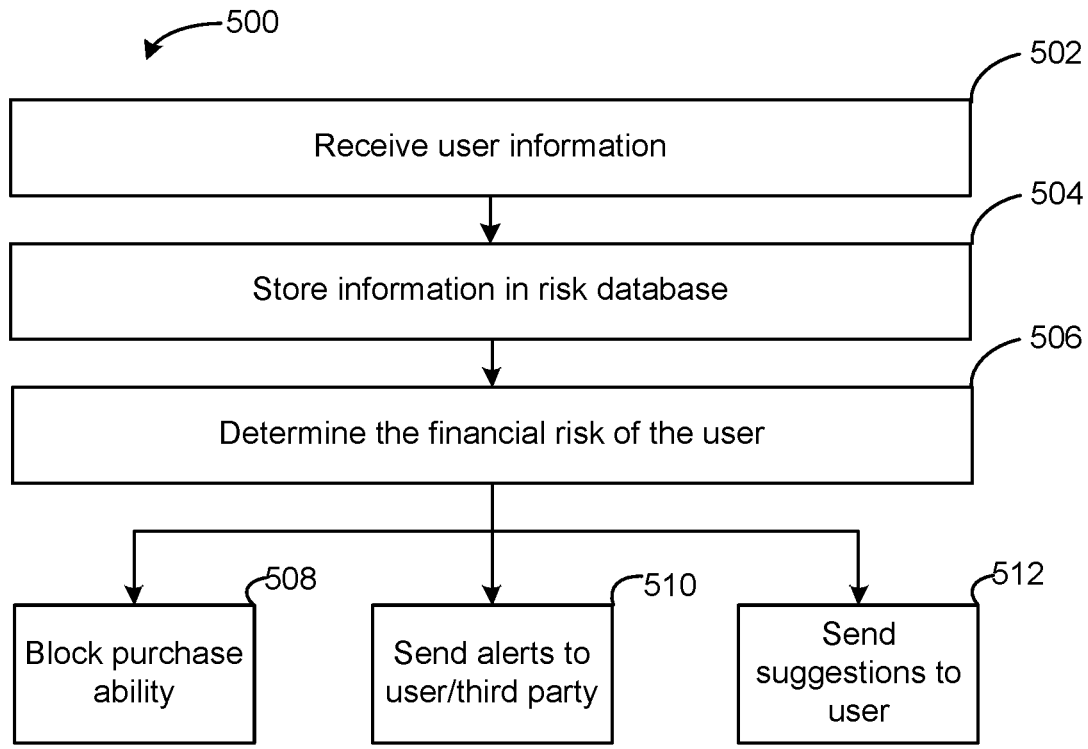
FIG. 5 is a flow diagram of a method for controlling a financial account of the user based on the user financial habits and goals, according to an example embodiment.

Referring now to FIG. 5, a process 500 for determining an appropriate account action (e.g., activate an account, deactivate an account, etc.) based on financial risk is shown according to an exemplary embodiment. Process 500 may be implemented by the financial institution computing system 142, mobile device 122, and social media server 190.

At process 502, user information is received by financial institution computing system 142 from at least one of mobile device 122, financial institutions 140, and/or social media server 190. In some embodiments, the user information is a GPS coordinate, the current companions of user 120, the budget limits of user 120, the name and/or identifier of a business if the mobile device 122 is at a business location, spending habits such as vices (e.g., gambling problems, drinking problems, etc.), amount of money spent within a predefined time window, and/or any other information associated with user 120 that may be stored on and retrieved from mobile device 122, financial institutions 140, and/or social media server 190. In some embodiments, financial institution computing system 142 may send a request to mobile device 122 in which user 120 may respond with the requested information.

At process 504, the information associated with user 120 is stored in risk database 152. Risk database 152 may store information associated with user 120 and may be stored temporarily and/or permanently. In some embodiments, financial institution computing system 142 may receive user information in process 502 and may determine habits and financial goals associated with user 120. For example, the information received in process 502 may be a survey of questions answered by user 120 that identify various habits and financial goals. Based on the results of the survey, financial institution computing system 142 may determine that user 120 has a gambling addiction and/or may be prone to spend excessive amounts of money at a certain bar and/or store. As such, gambling and/or certain bars or stores may be stored in risk database 152 as financially risky activities/locations associated with user 120.

At process 506, the financial institution computing system 142 determines the financial risk of the user 120. Based on the financial risk, actions such as process 508, process 510, and process 512 can be taken to prevent financial harm. Further, processes 508, 510, and 512 identify various exemplary methods in which financial risk may be identified and utilized to prevent financial harm. At process 506, the financial risk can be identified based on information stored in risk database 152. The information may include financial rules, user habits, financial spending information, mood of the user, current companions of the user, current location of the user and/or any other information. Further, this information can be retrieved from mobile device 122. Rules may define allowable spending limits, acceptable places to spend money, and certain locations that user 120 needs to avoid. For example, Tom may have a rule that he cannot spend any money in a casino and cannot spend more than $100 at any bar.

Financial institution computing system 142 can determine the financial risk in one or more ways. In some embodiments, the financial risk value is how close user 120 is to exceeding a spending limit or by how much user 120 has spent over the spending limit. For example, if user 120 has spent $50 and the financial spending budget in one night is $50, the financial risk may be 100% while if user 120 spends $25 the financial risk value may be 50%. In some embodiments, the financial risk value is how close (e.g., how many meters away from the location) user 120 is to a financially risky location (e.g., a certain business, entity, area of town, and/or any other establishment). In various embodiments, the financial risk value may be how long user 120 has been within a certain proximity to the financially risky location. For example, the longer the user spends within the proximity, the higher the financial risk may become. In another embodiment, the financial risk value may be the current mood of user 120 as determined by social media analysis circuit 302. For example, "sad" and "angry" may represent high financial risk while "happy" may represent low financial risk. In yet another embodiment, the financial risk may be based on the current companions of the user. For example, certain companions may cause financial institution computing system to set the financial risk of user 120 to "high" financial risk. When user 120 is with other groups of companions, the financial risk of user 120 may be set to "low" financial risk. Further, the various financial risk values laid out above can be combined into a composite risk value (e.g., based on averaging the risk values).

At process 508, the purchase ability of user 120 with an account associated with the financial institution 140 may be blocked based on financial risk. In some embodiments, when the financial risk is above a predefined amount, the account associated with financial institution 140 may be blocked. In some embodiments, the account is blocked by account status circuit 306. If the result of process 506 is that a user has spent money over a predefined threshold or is in a financially dangerous location (e.g., at a certain bar, a casino, a payday loan store, etc.), the financial accounts of user 120 with financial institution 140 may be temporarily deactivated. In some embodiments, a third party contact 160 receives a notification that the financial accounts of user 120 have been blocked and the third party mobile device 162 may be configured to override the deactivation. In some embodiments, the accounts may reactivate after a predetermined amount of time has passed (e.g., a day, an hour, etc.)

At process 510, an alert may be generated by the financial institution computing system 142 and may be sent to the user 120 and/or the third party contact 160 via mobile device 122 and/or third party mobile device 162 based on financial risk. In some embodiments, the alert may be generated and sent when the financial risk is above a predefined amount. In some embodiments, the alert may be a message (e.g., a text message, a phone call, etc.). For example, in some embodiments, the message may read "You are $30 from your spending limit for the night", or "If you do not leave the casino in 20 minutes your accounts will be deactivated." In some embodiments, the message may be sent to third party contact 160 via third party mobile device 162. The alert may allow the third party to immediately deactivate the financial accounts of user 120. For instance, if user 120 is in a casino and has ignored a notification to leave the casino, the third party contact 160 may be given authorization to deactivate the accounts associated with user 120 or to keep the accounts activated for certain types of transactions via third party mobile device 162. For example, if the user 120 is leaving the casino and needs to call a taxi, third party contact 160 may be able to keep the accounts associated with user 120 activated so that the user 120 is able to pay for a taxi.

At process 512, an alert may be generated by the financial institution computing system 142 and sent to mobile device 122. In some embodiments, the suggestions are generated when the financial risk of user 120 is above a predefined amount. For example, based on process 506, financial institution computing system 142 may determine that user 120 is planning to go to a bar with a certain group of friends based on social media activity. Financial institution computing system 142 may use the spending habits of the user when the user is with the group of friends. Financial institution computing system 142 may send a message to user 120 via mobile device 122 that suggests an activity besides hanging out with the group of friends, suggests an activity besides going to a bar, suggests an activity besides going to a casino, etc. The activity may identify financially safe things to do or alternative events occurring nearby user 120. For example, the events may be yoga classes, dance classes, concerts, run/walk events, etc.

Figure 6:
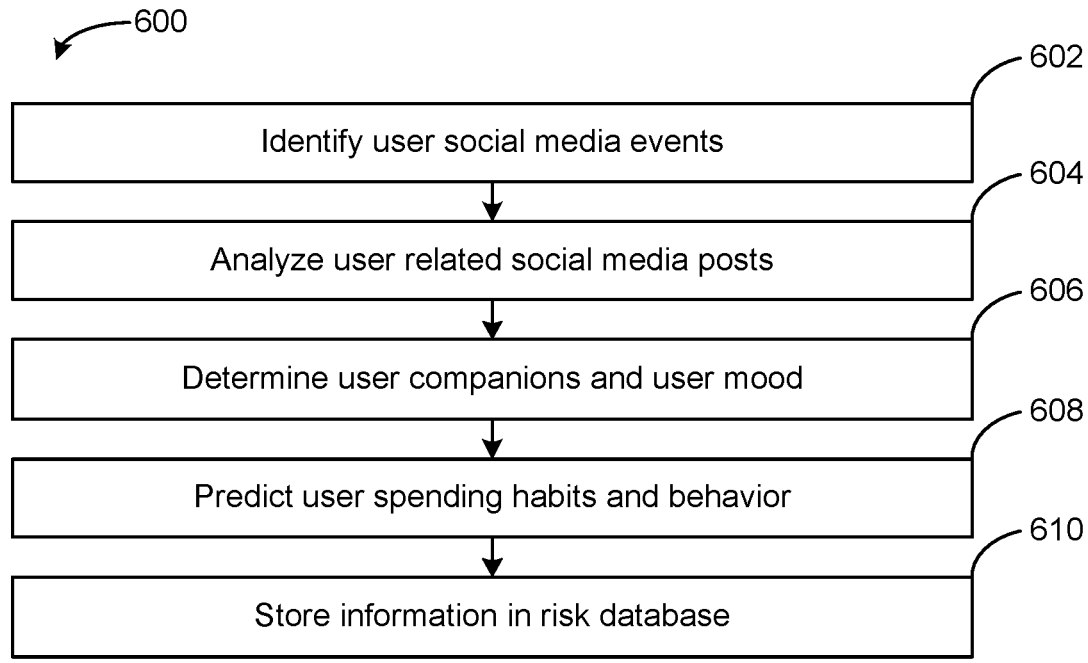
FIG. 6 is a flow diagram of a method of using social media events to predict user actions, according to an example embodiment.

Referring now to FIG. 6, a process 600 for determining financial risks based on social media activity is shown according to an example embodiment. Process 600 may be implemented by financial institution computing system 142, mobile device 122, and social media server 190. In some embodiments, process 600 is performed by social media analysis circuit 302.

At process 602, social media events associated with user 120 are identified. The financial institution computing system 142 may be configured to send a request to the social media server 190 for social media events associated with user 120. The social media server 190 may respond with the location, time, friends attending the event, and/or any other information regarding the event. For example, the social media server may provide event information from TWITTER®, FACEBOOK®, MYSPACE®, and any other social media service.

At process 604, social media analysis circuit 302 of the financial institution computing system 142 and/or the social media server 190 is configured to analyze social media posts associated with user 120 for financial risk. The social media posts may be analyzed by words and/or phrases. Word's such as "casino", "need money", and "let's get drunk" may indicate that user 120 plans on visiting a casino, a payday loan, a bar, and/or any other location which may be damaging to the health of user 120 and/or may cause user 120 to exceed financial spending budgets.

At process 606, the mood of user 120 is determined by analyzing social media activity associated with user 120 in order to predict financial risk. In some embodiments, the analysis of social media activity is performed by social media analysis circuit 302. In some embodiments, social media analysis circuit 302 may analyze social media posts and/or "emotion likes" to identify a mood (e.g., Bob is feeling "Angry", "Sad", "Happy", "Excited", etc.) indicative of the financial risk of user 120. For example, if user 120 identifies as "Depressed" on a social media platform, the social media analysis circuit 302 may determine that the user 120 may be in financial risk of spending excessive amounts of money at a bar. Further, check-in posts may be analyzed to determine companions that the user is currently with and where the user and the user's companions are located. For example, user 120 may post a check-in stating "Getting beers with the bros at Mike's Lemonade Bar" and tag three friends. The financial institution may record the amount of money that user 120 spends at Mike's Lemonade Bar and the amount of money that user 120 spends when with the three friends.

At process 608, the financial institution computing system 142 may be configured to predict the spending habits of user 120 based on the social media activity of the user. Data identified in processes 602-606 may be trended to identify the behavior of the user 120. In some embodiments, the financial institution computing system 142 is configured to determine the spending habits of the user when the user is with certain friends, in a certain mood, at a certain business, etc. Based on the spending habits of the user, risk factors can be identified. The risk factors may include certain stores, companions, and/or other factors that present a high level of financial risk for the user. These factors may be stored in the risk database 152 (process 610).

Figure 7:
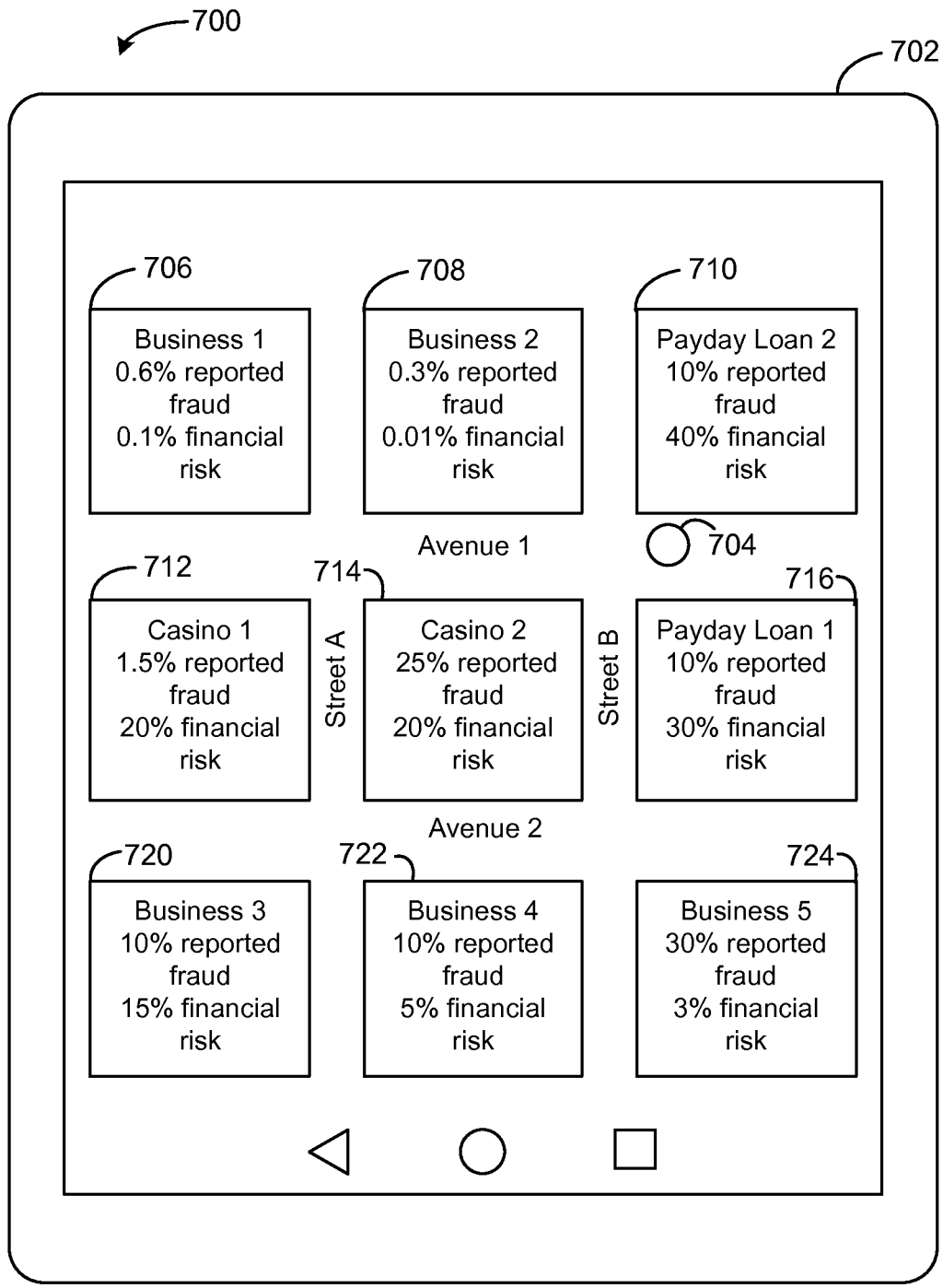
FIG. 7 is a drawing of an application interface for the mobile device of FIGS. 1-2, according to an example embodiment.

Referring now to FIG. 7, a display screen 700 for displaying the financial risk and fraud reports for local businesses is shown according to an exemplary embodiment. Screen 700 may be implemented by mobile device 122. Mobile device 702 is shown to be a mobile device such as a smartphone, a tablet, etc. In some embodiments, mobile device 702 may be or may have components of mobile device 122. Mobile device 702 may execute the risk application 124 and communicate with the financial institution computing system 142 via the network 104. In some embodiments, the financial institution computing system 142 sends mobile device 702 a list of surrounding businesses, a fraud score associated with the business, and a financial risk score associated with the business. The fraud score may be based on a percentage of customers that have reported fraud at the business. The financial risk score may be based on a value which identifies the financial risk which a particular business may have for the user of mobile device 702. For example, the user of mobile device 702 may make poor financial decisions frequently and account status circuit 306 may change the value for the financial risk based on user habits of the user of mobile device 702. The map shown in FIG. 7 includes businesses 706-724. Further, the map shows the immediate and/or last location of user 704.

In some embodiments, mobile device 702 is third party mobile device 162 of third party contact 160. The mobile device 702 may show the location of user 704 from the third party contact 160 to monitor. The map may indicate if user 704 is in any financial risk and/or has spent a prolonged period of time at a certain business or financially risky location.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A financial institution computing system, comprising:
a network interface configured to communicate with a mobile device of a user;
a database storing transaction data of the user and financial data for a plurality of entities, each entity associated with a location; and
a processor configured to:
receive, via the network interface, location data indicative of a location of the mobile device;
receive, via the network interface, the financial data for at least one entity of the plurality of entities, the at least one entity associated with a location;
determine a financial risk of the user based on a comparison of the location of the mobile device with the location of the at least one entity and based on at least one of the financial data for the at least one entity and the transaction data of the user;
generate a first notification in response to the financial risk exceeding a financial risk threshold, the first notification indicating that the user of the mobile device is susceptible to a financial risk based on the location of the user with respect to the at least one entity;
cause the network interface to transmit the first notification to the mobile device;
determine a location is a high-risk location in response to determining that a risk level associated with the location exceeds a predefined threshold;
monitor an amount of time the user spends at the high-risk location based on the location data indicative of the location of the mobile device;
generate a second notification in response to monitoring the amount of time the user spends at the high-risk location, the second notification including a threshold amount of time before a financial account associated with the user will be deactivated;
cause the network interface to transmit the second notification to the mobile device; and
deactivate the financial account associated with the user in response to the user spending over the threshold amount of time at the high-risk location.

2. The system of claim 1, the processor further configured to:
receive, via the network interface, social media activity data associated with the user from a social media server; and
determine, based on the social media activity data, a mood of the user, a current companion of the user, and the location of the user.

3. The system of claim 2, wherein the processor is further configured to determine the financial risk of the user based on the mood of the user, the current companion of the user, and the location of the user.

4. The system of claim 1, wherein the first notification comprises at least one of an alternate activity suggestion for the user and a warning message, and wherein the second notification comprises at least one of an account lockout and an account activation.

5. The system of claim 1, the processor further configured to:
receive, via the network interface, a user habit associated with the user of the mobile device, wherein the predefined threshold is a user habit threshold based on the transaction data of the user.

6. The system of claim 1, wherein the processor is further configured to deactivate the financial account associated with the user in response to cumulative purchases of the user exceeding a spending threshold within a predefined time period.

7. The system of claim 1, wherein the processor is further configured to activate the financial account associated with the user in response to the financial account associated with the user being deactivated for a predetermined amount of time.

8. The system of claim 1, wherein the processor is further configured to receive, via the network interface, contact information for a third party contact and a financial budget of the user from the mobile device.

9. The system of claim 1, wherein the processor is further configured to cause the network interface to transmit the first notification or the second notification to a third party mobile device via the network interface.

10. A method, comprising:
receiving, via a network interface, location data indicative of a location of a mobile device associated with a user;
receiving, via the network interface, fraud data for a plurality of entities in proximity to the mobile device;
determining, by a processor, a financial risk of the user based on a comparison of the location of the mobile device, a location of at least one entity, and the fraud data associated with the at least one entity;
generating, by the processor, a first notification in response to the financial risk exceeding a financial risk threshold, the first notification indicating that the user of the mobile device is susceptible to a financial risk based on the location of the user with respect to the at least one entity;
causing, by the processor, the network interface to transmit the first notification to the mobile device;
determining, by the processor, a location is a high-risk location in response to determining that a risk level associated with the location exceeds a predefined threshold;
monitoring, by the processor, an amount of time the user spends at the high-risk location based on the location data indicative of the location of the mobile device;
generating, by the processor, a second notification in response to monitoring the amount of time the user spends at the high-risk location, the second notification including a threshold amount of time before a financial account associated with the user will be deactivated;
causing, by the processor, the network interface to transmit the second notification to the mobile device; and
deactivating, by the processor, the financial account associated with the user in response to the user spending over the threshold amount of time at the high-risk location.

11. The method of claim 10, further comprising:
receiving, by the network interface, social media activity data associated with the user from a social media server; and
determining, by the processor and based on the social media activity data, a mood of the user and a current companion of the user.

12. The method of claim 11, wherein determining the financial risk of the user is further based on the mood of the user and the current companion of the user.

13. The method of claim 10, wherein the first notification comprises at least one of an alternate activity suggestion for the user and a warning message, and wherein the second notification comprises at least one of an account lockout and an account activation.

14. The method of claim 10, further comprising determining, by the processor, that the location is a high-risk location based on the fraud data associated with the at least one entity.

15. The method of claim 10, further comprising deactivating, by the processor, the financial account associated with the user in response to cumulative purchases of the user exceeding a predefined cumulative purchase limit within a predefined window of time while the user is at the high-risk location.

16. The method of claim 10, further comprising activating, by the processor, the financial account associated with the user after the financial account associated with the user has been deactivated for a predetermined amount of time.

17. A non-transitory computer readable media having computer-executable instructions embodied therein that, when executed by a transaction circuit of a financial institution computing system, causes the financial institution computing system to perform operations, the operations comprising:
- receiving, via a network interface, location data indicative of a location of a mobile device of a user and a habit of the user;
- receiving, by the network interface, financial data for at least one entity located in proximity to the location of the mobile device and social media activity data of the user from a social media server;
- determining a financial risk of the user based on the location of the mobile device with respect to the entity, the habit of the user, and the social media activity data of the user;
- generating a first notification in response to the financial risk exceeding a financial risk threshold, the first notification indicating that the user of the mobile device is susceptible to a financial risk;
- causing the first notification to be transmitted to the mobile device;
- determining a location is a high-risk location in response to determining that a risk level associated with the location exceeds a predefined threshold;
- monitoring an amount of time the user spends at the high-risk location based on the location data indicative of the location of the mobile device;
- generating a second notification in response to monitoring the amount of time the user spends at the high-risk location, the second notification including a threshold amount of time before a financial account associated with the user will be deactivated;
- causing the second notification to be transmitted to the mobile device; and
- deactivating the financial account associated with the user in response to the user spending over the threshold amount of time at the high-risk location.

18. The non-transitory computer readable media of claim 17, wherein the first notification comprises at least one of an alternate activity suggestion for the user and a warning message, and wherein the second notification comprises at least one of an account lockout and an account activation.

19. The non-transitory computer readable media of claim 17, wherein the predefined threshold is a user habit threshold based on transaction data of the user.

20. The non-transitory computer readable media of claim 17, the operations further comprising deactivating the financial account associated with the user in response to cumulative purchases of the user exceeding a spending threshold within a predefined time period.

21. The non-transitory computer readable media of claim 17, wherein the habit is associated with spending behavior relative to a spending limit, and wherein the entity is associated with the spending behavior.

22. The non-transitory computer readable media of claim 21, wherein the spending behavior relates to at least one of gambling, drinking, and shopping, and wherein the location is at least one of a casino, a bar, and a shopping mall.

* * * * *